Oct. 26, 1937.  U. F. LUEBBEN  2,096,990

ROTARY BALER

Filed Dec. 7, 1934  5 Sheets-Sheet 1

Inventor

Ummo F. Luebben

Oct. 26, 1937.  U. F. LUEBBEN  2,096,990
ROTARY BALER
Filed Dec. 7, 1934 5 Sheets-Sheet 4
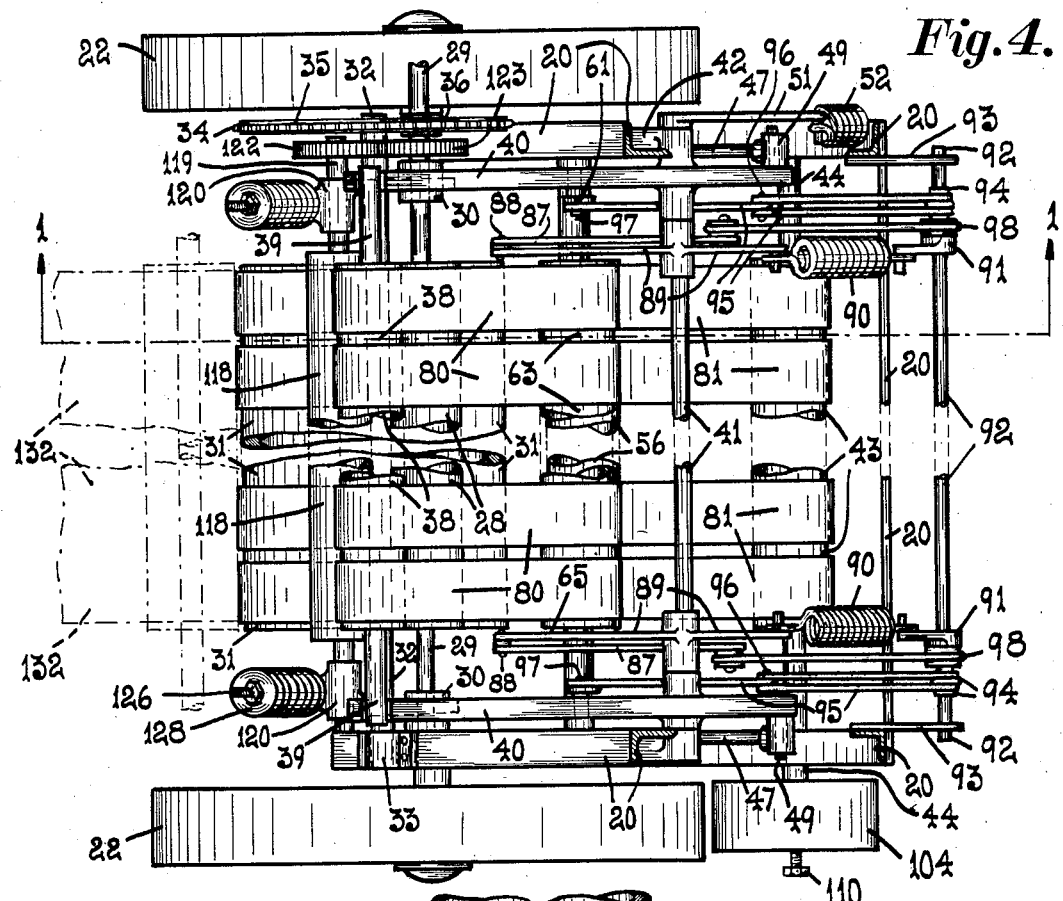
Fig. 4.
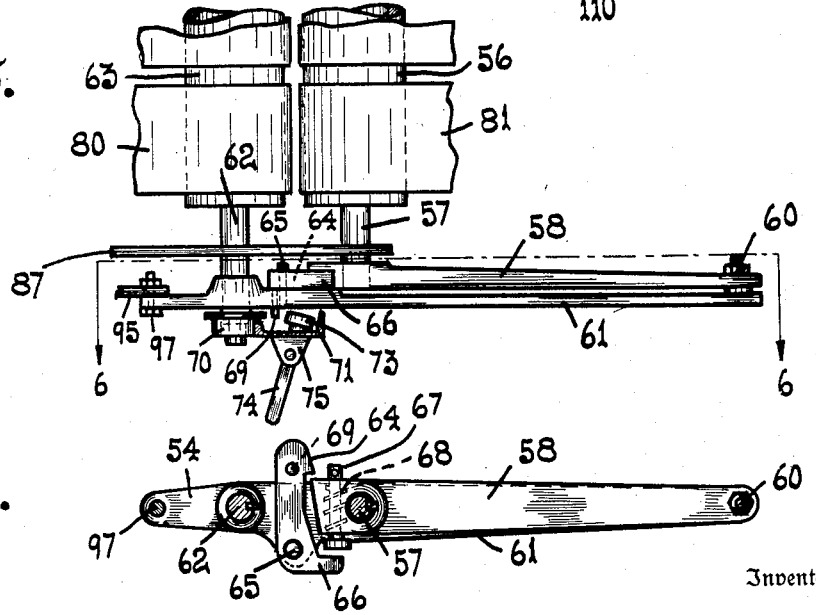
Fig. 5.
Fig. 6.
Inventor Oct. 26, 1937.  U. F. LUEBBEN  2,096,990
ROTARY BALER
Filed Dec. 7, 1934   5 Sheets-Sheet 5
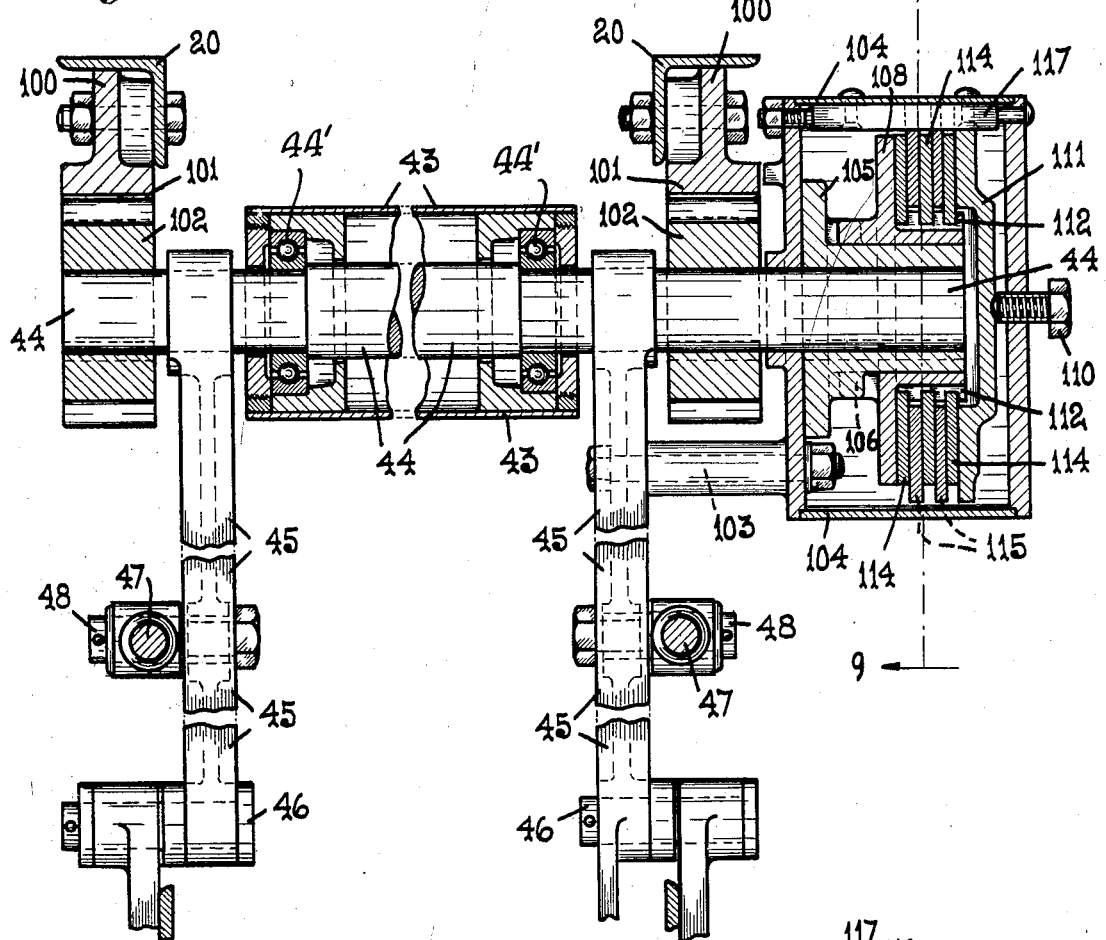
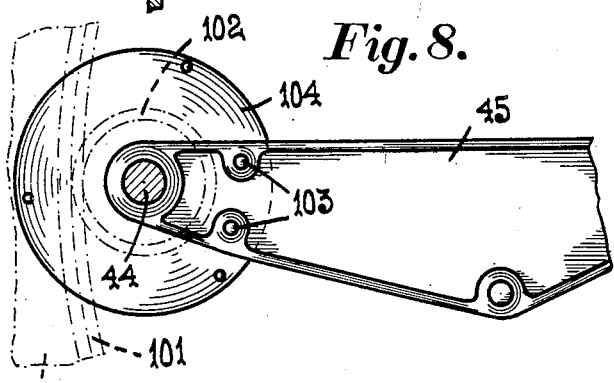
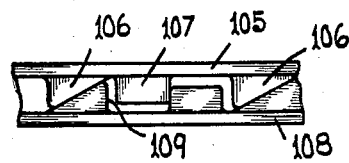
Inventor
Ummo F Luebben Patented Oct. 26, 1937

2,096,990

UNITED STATES PATENT OFFICE 2,096,990

ROTARY BALER

Ummo F. Luebben, Omaha, Nebr.

Application December 7, 1934, Serial No. 756,410

9 Claims. (Cl. 100—1)

This invention relates to the art of baling compressible substances such as cotton, straw, cornstalks, hay and the like, and has particular reference to rotary hay balers. Broadly, an object of the invention is to provide means for baling such materials in a more efficient, portable and economical manner than heretofore.

Various rotary mechanisms have been employed to form cylindrical bales, particularly of cotton. For rolling up stiff, stemmy hay, and such materials that do not readily roll back on themselves, spindles or the like devices were employed on which the bale was heretofore formed, with consequent lack of efficiency.

An object of the present invention is to provide a comparatively light mechanism which may be conveniently moved about, and of comparatively few and simple parts adapted to form compact cylindrical bales of hay or any fibrous material, and has particular reference to a means for starting the rolling of a bale and an efficient and adjustable means for making bales of various densities and size.

Another object of this invention is to provide a baling machine in which material such as cotton, straw, cornstalks, hay, or the like, may be passed into the machine in a compressed sheetlike form, where the material is subsequently rolled and further compressed during the rolling operation until a roll or bale of desired size has been produced which may be manually released from the machine.

A still further object of this invention is to provide a baling machine of this character, which eliminates the use of an axle or shaft about which the baling material is wrapped or wound.

A further object of this invention is to provide a machine of this character which is so constructed that any desired tension may be placed on the roll forming parts thereof, so as to compress the previously compressed material into the desired compactness in a cylindrical bale form.

Still another object of this invention is to provide in a baling machine oppositely moving flexible members which act to form the bale into cylindrical form and to provide means whereby one of the flexible members may have a portion thereof disposed in loose form to provide a pocket or bight within which the bale is initially formed.

Other and further objects and advantages of the invention will be understood from the following detailed description thereof, reference being had to the accompanying drawings in which, Figure 1 is a vertical section taken substantially along the dotted line 1—1 in Figure 4 and showing the relative position of the parts thereof at the time of the start of the formation of a bale of hay.

Figure 4 is a top plan view of the machine, certain medial portions thereof being broken away and certain lower portions of the mechanism not showing thereon, the view being taken substantially along line 4—4 of Figure 1.

Figure 5 is a rear elevation of fragments of certain rollers employed, together with certain portions of their operating mechanism.

Figure 6 is a side view of the operating mechanism shown in Figure 5, the view being taken on the line 6—6 of said figure.

Figure 7 is a sectional view of a swingable tension roller employed and releasing brake mechanism therefor.

Figure 8 is a side view of a fragment of a tension roller arm employed and brake mechanism housing therefor.

Figure 1:
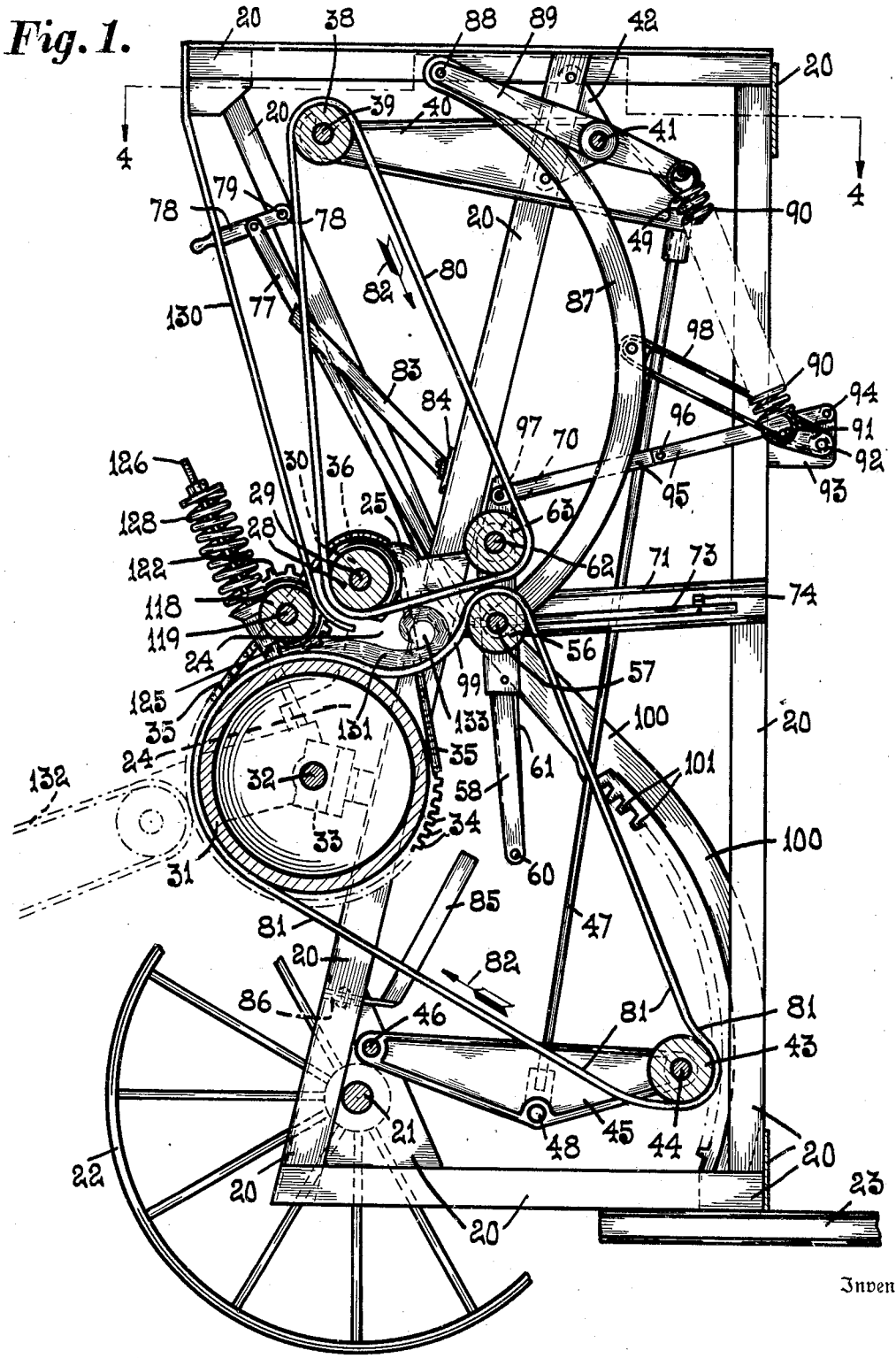

Figure 9 is a sectional view of the tension roller brake mechanism, the view being taken substantially on the dotted line 9—9 of Figure 7, and Figure 10 is a diagrammatic view of certain wedge teeth or cams employed in the releasing brake mechanism shown in Figure 7. The view being diagrammatic in that the parts are represented in Figure 10 in a flat plane whereas in practice the parts are curved or arcuate.

The invention primarily includes means for forming a bale, particularly a compact bale, and means for discharging the bale from the machine which will be particularly described and claimed herein. The invention also contemplates means for feeding hay into the machine, means for automatically stopping such feeding and wrapping the bale with twine prior to its discharge from the machine, and for starting the feeding when the bale has been discharged, said feeding and wrapping means comprising separate inventions briefly described or mentioned herein, and which are to be fully described, illustrated and claimed in separate applications.

Referring now to the drawings for a more particular description, the machine includes oppositely disposed side frame members 20, suitably arranged in vertical, horizontal and inclined directions, as shown, and connected together by means of an adequate number of transversely disposed members, the arrangement of parts being such that the following described mechanism is adequately supported.

The whole machine may be mounted on a four-wheel truck or on any suitable arrangement for portability, but preferably, it is mounted on two oppositely disposed wheels 22, with the axle 21 secured to the frame 20, as shown in Figure 1.

The machine is normally supported in a vertical position as shown in Figure 1, by means of a tongue 23 secured to the frame at one of its ends, and supported at its other end by any suitable means, not shown. Or, the tongue may be supported by a tractor, the engine of which may be employed to furnish motive power for operating the later described mechanism, and for towing or moving the machine from place to place.

Oppositely disposed brackets 24 are bolted or otherwise secured to the inclined uprights of the frame 20. An upper-driver-roller 28 for upper belts 80 is keyed or otherwise secured to a driver-shaft 29, said shaft running in journal boxes 30 which are bolted to the upper part of brackets 24, as best shown in Figure 4. The driver-shaft 29 extends at one end to receive a driven pulley or any other suitable driving gear, not shown, for receiving the motive power from the tractor or engine for driving the mechanism.

Below the upper-driver-roller 28 a drum-roller 31 for driving the lower belts 81 is keyed to its shaft 32, the latter being carried by journal boxes 33, which are bolted to the lower part of the brackets 24 or to the frame.

At one end of the drum-roller shaft 32 is keyed a sprocket wheel 34 carrying a sprocket chain 35, which is driven by a driver-sprocket 36 secured to driver-shaft 29. An upper tension-roller 38 for upper belts 80 idles on its shaft 39 which is carried in suitable sockets or otherwise at the front end of oppositely disposed upper-tension-roller-arms 40.

The arms 40 are swingably mounted on a rod 41 which is carried by bearings in brackets 42, the latter being secured to or forming a part of the side members or side portions of the frame 20.

A lower-tension-roller 43 for the lower belts 81 is idly mounted on its shaft 44 and is swingably carried by and between oppositely disposed lower tension roller arms 45, which are pivotally attached to the frame as at 46.

Figure 2:
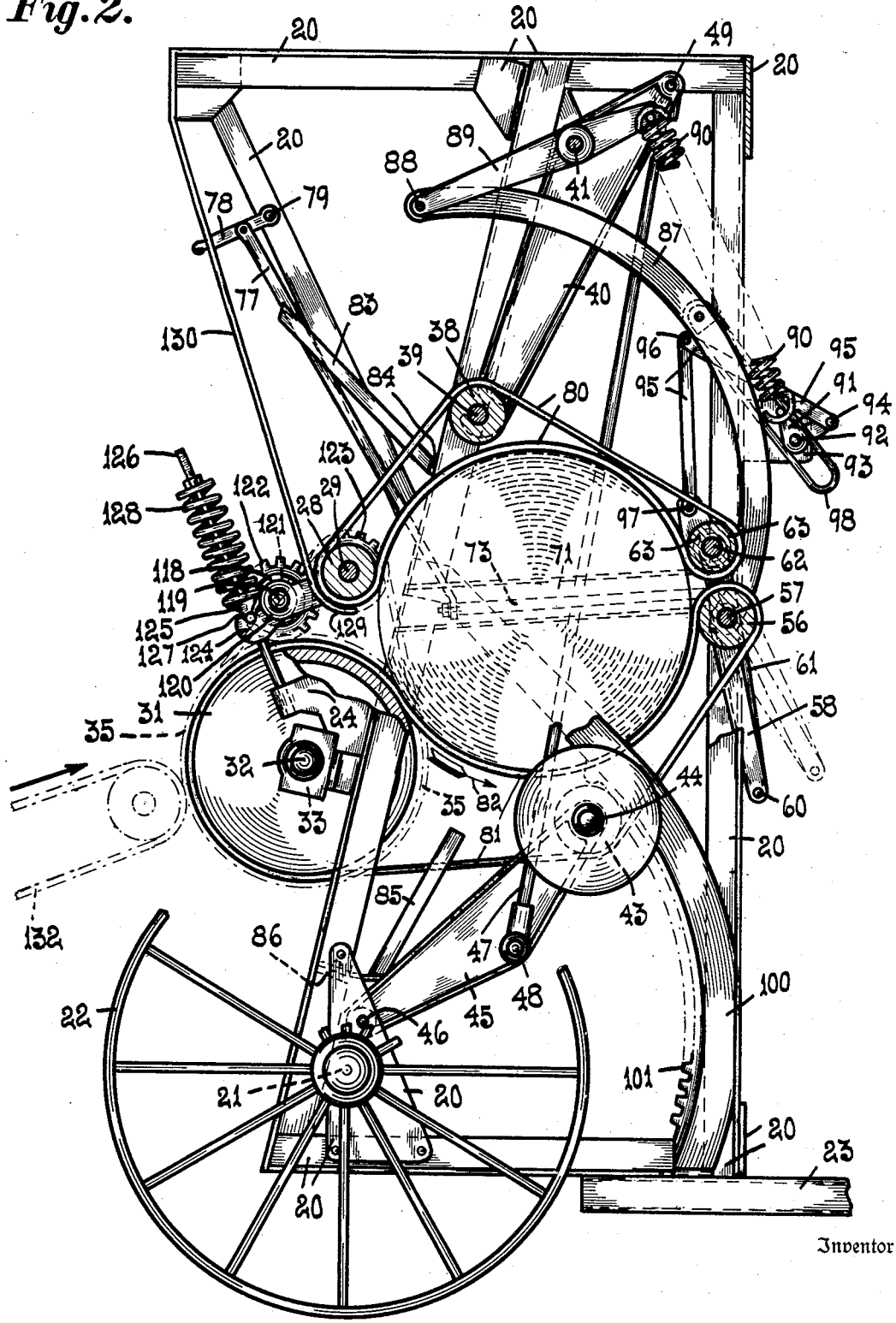
Figure 2 is a view similar to Figure 1, but showing the relative position of the parts at the time a bale has reached its maximum size and prior to the ejection thereof from the machine.
Figure 3:
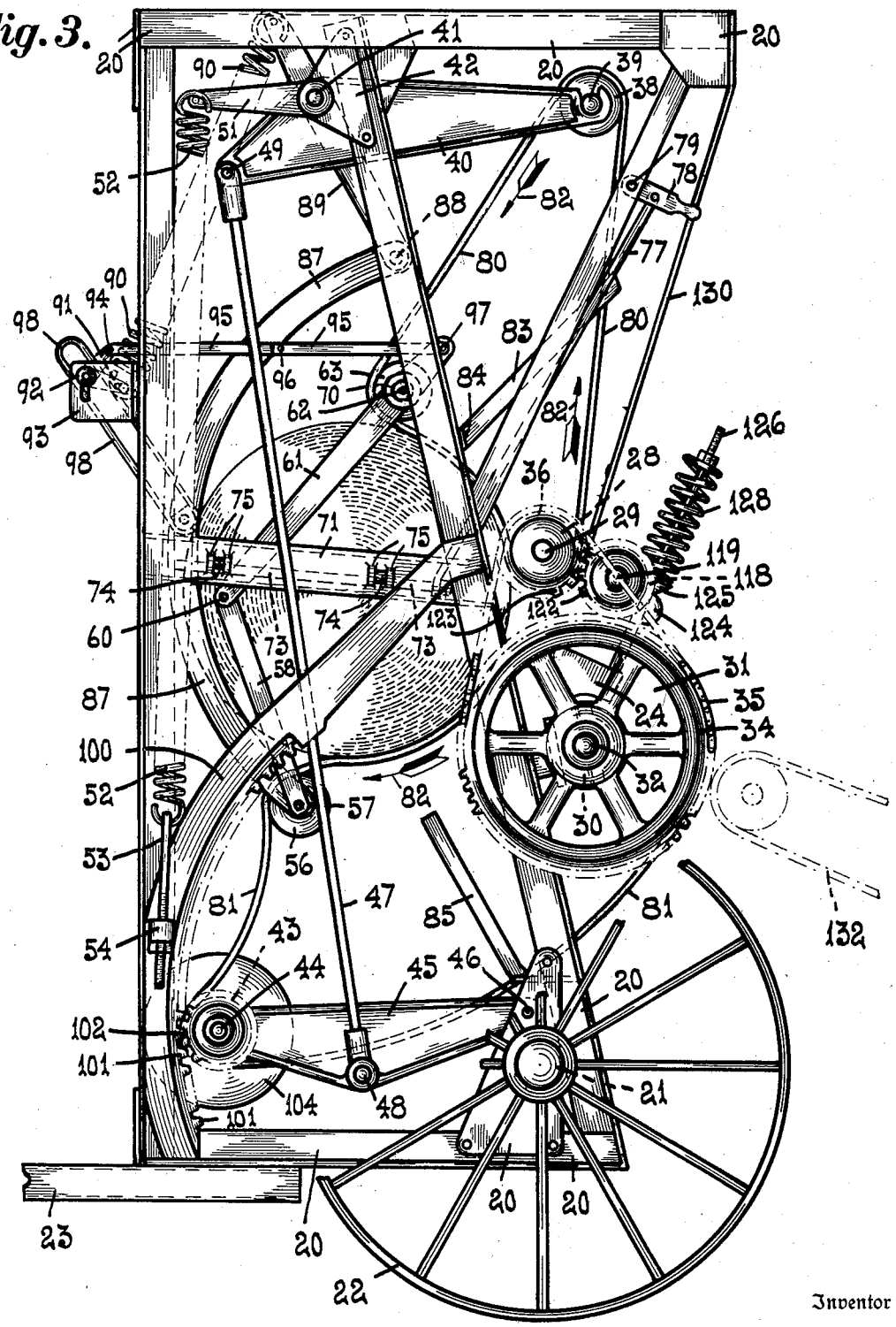
Figure 3 is a view of the machine in side elevation, certain parts broken away and showing the relative position of the parts during the ejection of a formed bale, the view being taken from the opposite side of the showing thereof as in Figure 2.

The lower-tension-roller-arms 45 have simultaneous and corresponding movements with respect to each other and simultaneous movements with respect to the upper-tension-roller-arms 40, said movements being actuated by means of connecting rods 47, which, as shown in Figures 2 and 3, are pivotally mounted, as at 48, to the lower tension roller-arms 45, and to the upper arms 40, as at 49, being best shown in Figure 3.

As best shown in Figures 3 and 4, an arm 51 is keyed to the end of rod 41, said rod being also keyed to the upper-tension-roller-arms 40. A normally contracting spring 52, as best shown in Figure 3, is secured to the outer end of the arm 51 and extends downward therefrom and connects with a spring tension-adjusting bolt 53, the latter extending through an eye 54 provided upon any suitable place of the frame 20.

A lower-trip-roller 56 is idly mounted on its shaft 57 which is keyed or otherwise rigidly secured at each end to and between oppositely disposed lower-trip-arms 58, which are pivotally connected, as at 60, to the oppositely disposed upper-trip-arms 61 and the latter are rigidly keyed or secured to a shaft 62, on which is idly mounted upper trip roller 63, as best shown in Figure 5. All of the aforesaid rollers are of substantially the same length as that of a bale formable by the machine.

These trip rollers 56 and 63 are normally held in approximate alignment with the pivots 60 of the pairs of arms 58 and 61 so as to be normally bue releasably maintained by hooks 64, one each of which is pivotally secured to an arm 61, as at 65, as best shown in Figure 6. The means for mounting the oppositely disposed hooks 64 in releasable locking engagement with the lower-trip-arms 58 include a finger 66 for each hook formed integrally with each hook 64, which operate in conjunction with oppositely disposed pins 67, each of said pins being normally urged outwardly by means of a compression spring 68 placed about the pins and housed within the arms 58. Said fingers also prevent too great movement of the lower-trip-arms 58 past the "dead center" or normal alignment of the arms 61 and 58 as shown in Figure 6. Said springs 68 also act as a cushion at the time of the closing up of the rollers 56 and 63, after the discharge of a formed bale, as later described. The hooks 64 each have a transversely disposed stud 69 projecting past the arms 61 for the purpose of unlocking the trip arms 58 from the arms 61, as later described.

As best shown in Figure 5, on each end of the shaft 62, which extends through opposite arms 61, a flanged guide wheel 70 is rotatably mounted. Said flanged wheels during the growth of the bale ride on the upper surfaces of oppositely disposed guide rails 71 which are secured at their ends to the side frame members of the frame 20 between which the said trip arms have movements.

The guide rails 71 are of channel shape in cross section, the lower guide flange being wider than the upper track flange as shown in Figure 5. In these channels, tilting bars 73 are located, said bars being designed for discharging a formed bale. These bars have near each end projections 74 that extend through apertures of the guide rails 71 and are each pivoted to adjacent ears 75 of the rails.

The forward ends of the tilting bars are pivoted to the lower ends of reach rods or straps 77, as best shown by the dotted line portions thereof in Figures 2 and 3. The upper ends of the reach rods are pivoted to levers 78, which are rigidly secured upon and near the ends of a rod 79. The rod 79 is rotatably supported by and between the side members of the frame 20 whereby only simultaneous movements of both tilting bars 73 are permitted. The levers 78 may be extended in any suitable direction for manual actuation and lifting said tilting bars for causing the discharge of the bale, as will be later explained.

The upper-baling-belts 80 are driven by the upper drive roller 28 and pass over the upper tension roller 38 and upper trip roller 63. The lower baling belts 81 pass over and are driven by the drum roller 31, over the lower trip roller 56, and lower tension roller 43.

The belts 80 and 81 travel in a direction as shown by the arrows 82, or clock-wise as indicated in Figure 1 and as best shown by Figure 4, the belts 80 and 81 are preferably made of a plurality of comparatively narrow aligned parallel belts of suitable width. In order to guide them and prevent longitudinal movement with respect to their carrying rollers, guide members or fingers 83 are placed between the upper belts 80, said members being rigidly secured to a transversely disposed supporting member 84 of the frame 20. Similarly the lower belts 81 are provided with guide members 85 carried by a frame member 86.

Oppositely disposed hanger members 87 which are arcuately shaped, as in Figure 1, are pivotally mounted on the lower trip roller shaft 57 and provide a pivotal mounting for the shaft 57, adjacent to arm 58, as best shown in Figure 5. As best seen in Figures 1 and 2, the upper ends of the hanger members 87 are pivotally attached as at 88 to the hanger levers 89, the latter being swingably positioned upon the rod 41.

To ends of levers 89 oppositely disposed contracting springs 90 are connected, one spring to each hanger-lever, the lower ends of said springs are attached to oppositely positioned bell crank levers 91, the latter being pivotally carried on a rod 92, which is supported at each of its ends by plates 93 which comprise a part of the frame 20.

The bell cranks 91 are each pivoted as at 94 to opposite disposed links 95, which are of two-piece vertically aligned construction, the parts thereof being pivotally connected together as at 96. The links 95 are further pivotally attached, as at 97, to the upper ends of the upper trip roller arms 61, as shown in Figure 5, and the connections are such as to limit the forward movement of roller 63, toward the drive roller 28, with a cushioning effect provided by the springs 90 at times when the parts are in their relative positions shown in Figure 1. The springs 90 provide tension on the upper belts 80, during the initial wrap of the bale, as shown in Figure 1, by urging the roller 63 towards the bell cranks 91.

To each hanger member 87 is connected a looped link 98; said links encircle the rod 92 and function to limit the movement of the lower trip roller 56 toward the drum roller 31, but permit it to move away therefrom.

It will be noted that by virtue of the pull of the spring 52 (but one such spring 52 is employed) on the upper tension roller 38 through the arms 51 and 40 that the upper belts 80 are taut at all times, and the arrangement is such that during the initial formation or wrap of the bale, the trip rollers 56 and 63 are suspended so that the guide wheels 70 are slightly raised from and above the guide rails 71, and at this time the lower belts 81 are slack, permitting a bight 99 in said belts 81 as shown in Figure 1.

It will be understood that the density of the bale is determined by the tension of the baling belts 80 and 81, and the pressure resulting therefrom on the incoming mat of hay between the drum roller 31 and the pressure roller 118 as the bale is formed and increases in diameter.

While the spring 52 furnishes some tension to the belts 80 and 81 during the increase in diameter of the bale its primary function is to bring the rollers 38, 63, 56 and 43 back to their initial position upon and after the discharge of a formed bale and to provide the initial tension on belts 80, as heretofore explained. To provide for a uniform, adjustable and adequate tension to the belts during the growth of the bale, a releasing friction brake mechanism, now to be described, is preferably used.

Arcuately shaped and oppositely disposed rack bars 100 are secured to the frame and provided with teeth 101 which mesh with pinions 102, one each of the latter being keyed to the shaft 44 of the roller 43, the latter disposed between the arms 45. As best shown in Figure 7, to one of said arms 45 is bolted as at 103 a brake mechanism housing 104 which is rigidly secured whereby said arms and said housing have simultaneous corresponding movements at all times.

The brake mechanism within the housing includes a flanged collar 105 which is keyed to the shaft 44, a face of the flange thereof being provided with cam or inclined lug surfaces 106 and stop lugs 107 which are rectangular in plan and arranged as best shown diagrammatically in Figure 10, said cams 106 and lugs 107 being arranged in alternate relation with respect to each other on said face with spaces for receiving oppositely disposed lugs in said spaces as later described.

A flanged sleeve 108 is loosely mounted for longitudinal sliding movements upon the collar 105 and is provided with cams and stop lugs, similar to those of the collar 105 but oppositely disposed with respect thereto, said cams of the sleeve being oppositely inclined and being so arranged with respect to those of the collar that at times the distance between the flanges of the collar and sleeve is increased or decreased, for purposes later explained. The sleeve may have a very limited rotary movement with respect to the collar, said limitation being approximate to the space indicated at 109 in Figure 10.

The housing 104 is provided with a pressure screw 110 for adjustment purposes, the inner end of said screw bearing against a recessed plate 111 which is adapted to have slight slidable movements longitudinally with respect to the housing 104.

As best shown in Figure 9, the flanged sleeve 108 is provided with longitudinally disposed ribs 112 which are received within correspondingly shaped recesses 113 of friction plates 114 and between said plates shims 115 are employed and equipped with a plurality of notches 116 upon their perimeters for receiving elongated lugs 117, the latter being riveted or otherwise suitably secured to the inner annular walls of the housing 104, the arrangement being such that the plates and shims are permitted to have sliding movements longitudinally of and within the housing, the degree of said sliding movements towards the pressure screw 110 being limited by the position and adjustment of said screw 110, while at the same time the plates 114 are permitted to have rotary movement simultaneously with sleeve 108, while the shims 115 are prevented from having rotary movements by the stop members 117.

It will be noted that the shims and plates are disposed between the flange of the sleeve 108 and the recessed plate 111, and it will be understood that, upon the rotation of shaft 44 and the flanged cam collar 105 incident to the upward movement of tension roller 43, the cams of collar 105 climb with respect to the cams of sleeve 108 to the extent of the limitation indicated at 109, as in Figure 10, and plates 114 and shims 115 are squeezed together, providing frictional resistance to the upward movement of arms 45. This frictional resistance may be increased or decreased at the will of the operator, by adjusting the pressure screw 110 for any tension desired for application of the tension to the belts.

Upon the discharge of the bale and the swinging of tension rollers 43 and 38 to their initial position as shown in Figure 1, the direction of the rotation of shaft 44 and cam collar 105 is reversed, and the cams of the collar 105 and sleeve 108 slide upon and towards each other, thereby releasing the pressure and friction between said plates and shims, and permitting the unresisted return of the rollers 43 and 38 to their initial position.

A hay feeding and pressure roller 118 which is keyed to its shaft 119 is mounted above and rides on belts 81 which pass over the drum roller 31, or upon the hay interposed between said feed roller and said belts, as best shown in Figure 1. The shaft 119 rotates in swingable bearings 120, best shown in Figure 2 and 4.

Projecting from one side of each of the bearings 120 is an extension 121 that engages each oppositely disposed journal boxing 30 of the driver shaft 29, so as to permit the feed roller to swing from shaft 29 as a center. The said hay feeding and pressure roller 118 is driven by a pinion 122 keyed on the end of the shaft 119 and is in mesh with a spur gear 123 keyed to the drive shaft 29, as shown in Figure 4.

On each bearing 120 opposite to the extensions 121 thereof is a bifurcated portion providing a pair of hooked fingers 124 arranged to straddle the stub axles of spring seats 125. The members 125 are slidable with respect to spring posts 126 which extend through the seats. The lower ends of said posts are suitably secured to brackets 24. On each side of the spring seats 125 are provided stub axles 127 that may rock in and are received upon the hooks of fingers 124, as best shown in Figure 2. An expanding spring 128 on each post 126 urges the said roller 118 toward the drum roller 31 at all times, so as to initially form the incoming material in a relatively compact layer as shown in Figure 1.

A shield 129 which is arcuate in cross section extends between the feeding roller 118 and the upper drive roller 28, as best shown in Figure 1, and is secured at its sides to and between the oppositely disposed brackets 24 and also is secured to an upwardly extending brace 130 which is carried by the frame 20. This brace provides a mounting for the heretofore mentioned twine wrapping device. The shield 129 functions to prevent the incoming hay 131 from contacting with the upper belts on the drive roller 28 too soon and passing up between said roller and the feeding roller 118.

A hay feeding conveyor trough, not shown, but having a travelling belt, indicated by the dotted lines 132, or other suitable means for delivering the hay to and from compression between the drum and feeding rollers, is preferably attached to and suspended from the front of the machine. The belt 132 is of substantially the width of the machine and is driven by any suitable means, not shown.

In operation, the hay or other material received on the conveyor belt 132, either manually or otherwise, is fed to the belts 81 on the drum roller 31 and then passed between feeding roller 118 and belts 81 on the drum roller 31, and is compressed by action of the springs 128 into a mat. The mat of hay is forced into baling space 133, between belts 80 and 81. The feed roller riding on belts 81 between it and the drum roller 31 or on the hay interposed between the feeding roller and the belts aids in driving said belts 81 and in maintaining the bight 99 of the belts 81 during the slack period of the belt, as well as forcing the hay into the cradle or baling space 133 initially provided by said bight.

It will be noted that the direction of the travel of the mat, as shown in Figure 1, upon first entering the cradle, is toward and below the center of the lower trip roller 56. The mat is then turned up by the belt 81 incident to the shape of the cradle and against the oppositely moving surface of the upper belts 80, which cause the mat to turn back upon itself, starting the rolling up of the bale.

The pressure provided by means of the springs 128 of the feed roller 118 also flattens all stems of hay into ribbon-like elongated configurations for facilitating more readily the said rolling up action, which usually first forms a wad lengthwise in the roomy space or cradle 133 provided by the bight 99 of the belts 81, and prior to the wad rolling over upon itself as shown in Figure 1.

It will be noted that the trip rollers 56 and 63 are "floaters" or not directly fastened to the frame, but are suspended, governed by the tension of the upper belts 80 and from the hanger members 87, and limited in their forward movements by links 95 and 98 during the initial period of the formation of a bale.

It will further be understood that the roller 63 is held back by the aforesaid mechanism normally farther from the drum roller 31 than is the lower trip roller 56, at this initial period, so that the belts 80 and the bight 99 of belts 81 form the cradle as shown in Figure 1. Otherwise it has been found, and will be understood, that the incoming edge of a stiff mat of hay would wedge in between said trip rollers and prevent the rolling up of the hay.

It is observed that the drum roller 31 is relatively much larger in diameter than the upper drive roller 28 as well as the feeding and pressure roller 118. This permits the use of the feeding roller directly upon the drum roller so as to force the hay approximately tangently through the throat of the baling space, that is, between said hay driving rollers.

In the second stage of the formation of the bale, when it takes on a true cylindrical form, the trip rollers move downward until track wheels 70 ride on rails 71, and the lower trip roller 56 moves backward so that said trip rollers and the upper and lower drive rollers 28 and 31 respectively all contact the surface of the cylindrical bale with the lower as well as the upper belts in taut condition, and as the bale increases in size the tension roller 38 is drawn downward and lower tension roller 43 is drawn upward.

As the bale continues to enlarge in diameter, the trip rollers 56 and 63 are pushed back along guide rails 71, the arrangement being such that the growing bale continues in a proper contact between the trip rollers and the drive rollers, for the most efficient rolling up of dense highly compressed bales.

It will be noted that the trip rollers freely adapt themselves to any irregularity of the bale surface, avoiding undue strain on the machine, or parts thereof.

The links 95 and the links 98 now cease to function. The links 95 bend up at their pivots 96 and the links 98 slide freely backward on the shaft or rod 92, while the tension roller 43 continues to move upward and the tension roller 38 moves simultaneously downward, expanding the spring 52.

The bale is discharged by manually lifting the tilting bars 73 by means of lever 78 and rods 77 for the bars 73 which contact with the studs 69, lift the hooks 64 and release the locked trip arms 58 and 61. Then the tension of the belts 81, incident to the urge of spring 52, causes the lower trip roller 56 to pass downward under the bale, while the upper trip roller 63 passes over the bale, as seen in Figure 3, as the tension rollers 38 and 43 move away from each other.

At this time the springs 90 are expanded and the links 95 function to prevent the roller 63 from moving too far forward or toward the drive roller 28. The bell-cranks 91 in conjunction with the springs 90 prevent a too sudden or severe stopping of such movement with a cushioning of elastic action. The connecting links 95 being attached to the arms 61 above the shaft 62 of the trip roller 63, due to the tension of the belts 80 and spring 90, aid in pushing the roller 56 under the bale, and thereafter in closing and locking the mechanism in conjunction with the hanger members 87.

As the bale is discharged due to the tension of belts 81, the roller 56 swings downward and under the bale with force, expanding the springs 90, which then, as the bale is cleared and drops out, lifts said roller up to the closed, initial position.

During the closing up portion of the operation, the links 98 limit the forward path of the lower trip roller 56, preventing it from bumping the drum roller 31 and bringing the said trip roller 56 to the initial position shown in Figure 1.

It will be seen that as the bale grows the studs 69 of the hooks 64 travel along the tilting bars 73, and that the bale may be discharged at any desired time during the formation thereof; thus bales small in diameter may be formed and discharged, or such larger bales as are within the capacity or size of the machine.

It will be seen that the above described mechanism also serves to suspend the trip rollers in a lifted position as shown in Figure 1, in order to facilitate the initial rolling up of the hay, as heretofore explained.

Prior to the discharge of the bale and while it is in the position shown in Figure 3 and after it has been fully formed to the desired extent in diameter, the operator may manually encircle the bale with twine or wire by passing the latter between the spaced apart lower belts 81 and the similar spaced apart upper belts 80 since said upper and lower belts are in vertical alignment and manually tie the free ends of the wire or twine together for enclosing the hay in the compactly formed bale prior to discharge thereof from the machine. Although the present mechanism, as actually designed, includes automatic means (not shown or described herein) for wrapping the bale with twine and tying the free ends of the twine as well as means for carrying out the above stated objects, the said (not shown) means herein mentioned is believed to comprise separate inventions to be later shown, described and claimed in separate applications. It follows that the machine as described is useful in that after a bale is formed it may be manually tied or bound together.

Also the mechanism includes guide means disposed at each end of the cradle 133, but not illustrated herein, for preventing the bale from growing longitudinally in size.

As shown in Figure 7, the roller 43 may be mounted upon anti-frictional ball bearings 44' on the shaft 44.

It is obvious that various changes and modifications may be made in the details of construction and design of the above specifically described embodiment of this invention without departing from the spirit thereof, such changes and modifications being restricted only by the scope of the following claims:—

What is claimed is:—

1. A baling means comprising a frame, opposed endless members in the frame, means for supporting said members in opposed relation in the frame, operating means engaging each of said members for moving said members one opposite to the other, one of said members adapted to be looped to provide a pocket for initially forming a roll between the two members, tensionable feeding means forwardly of said pocket for initially compressing material before it is discharged into said pocket, tensionable holding means carried by the frame and engaging the members for yieldingly holding said members against separation during the rolling operation, and releasable discharging means connected to said tensionable holding means.

2. A baling means comprising a frame, opposed endless flexible members in the frame, means for supporting said members for movement in the frame, operating means for moving said members one in a direction opposite to the other, means for mounting one of said members so that a pocket is formed in the same when set up for operation, tensionable feeding means for initially compressing the material before it is discharged into said pocket, a pair of spring pressed trip rollers engaging said flexible members, interengaging means for mounting said trip rollers, said interengaging means being adapted when disengaged to permit movement of said rollers relative to each other whereby the same may move away from each other after the bale is formed, and releasable means to disengage the mounting means of the trip rollers so that the same may be swung to bale discharging position.

3. A baling means comprising a frame, opposed endless flexible members in the frame, means for mounting said members for movement in the frame, means for looping one of said members into pocket formation, tensionable feeding means forwardly of said pocket for initially compressing the material before the material is discharged into said pocket, a bale compressing roller for each flexible member, means for mounting said bale compressing rollers in the frame for movement away from or toward each other, means for tensioning said roller mounting means, and releasable discharging means for swinging said rollers into a bale discharging position.

4. A baling means comprising a frame, opposed endless flexible members in the frame, means for mounting said members for movement in the frame, operating means for moving said members one in a direction opposite to the other, means for looping one of said members to provide a pocket, tensionable material feeding means forwardly of said pocket for initially compressing the material before the material is discharged into said pocket, a pair of bale compressing rollers, there being one roller for each flexible member, means for mounting said rollers in the frame for movement toward or away from each other, means for tensioning the roller mounting means and manually releasable means engaging said roller mounting means to swing said rollers into bale discharging position.

5. A baling means comprising a frame, a pair of endless flexible members, means for mounting said flexible members in the frame with a portion of said members in opposed relation, means for looping one of said flexible members to provide a pocket in said opposed portion, tensionable feeding means forwardly of said pocket, a guard carried by the frame between one of said flexible members and said feeding means, a bale compressing roller engaging each flexible member, means for mounting said rollers for movement toward or away from each other, means for tensioning said mounting means, and releasable discharging means connected to said roller mounting means.

6. A baling means comprising a frame, a pair of flexible members disposed in the frame, one of said members having a portion thereof in spaced relation to a portion of the other member, operating means for moving said members in opposite directions, means for initially compressing the material in sheet-like form, means for looping one of said flexible members to provide a pocket adjacent said compressing means, said pocket being initially open at one side and closed at the other side, a bale compressing roller for each flexible member, means for mounting said rollers in the frame for movement toward or away from each other, tensionable means engaging said mounting means, and releasable discharging means connected to said tensionable means.

7. A baling means comprising a frame, a plurality of opposed endless flexible members disposed in the frame, means for mounting said flexible members in the frame for movement one relative to the other, operating means for moving said members one in a direction opposite to the other, means for maintaining said opposed flexible members in alignment, said flexible members of each series being disposed in spaced relation to each other, means for initially compressing the material in sheet-like form, one series of flexible members adapted to be looped to provide a pocket, said pocket having an open side confronting said compressing means, a pair of rollers disposed in spaced relation, one of said rollers engaging one series of flexible members and the other of said rollers, the other of said series of flexible members, means for mounting said rollers for movement toward or away from each other, said rollers being initially disposed closely adjacent each other whereby to close the other side of said pocket, tensionable means for tensioning said rollers, and releasable discharging means connected to said roller mounting means whereby to swing said rollers away from each other into bale discharging position.

8. A baling means, a frame, opposed endless members in the frame, means for supporting said members in opposed relation in the frame, operating means engaging each of said members for moving the same with one member opposite the other to form a roll between oppositely disposed movable portions of said members, tension feeding means forwardly of said oppositely disposed portions of the members for initially compressing material passing between said oppositely disposed portions, tension holding means carried by the frame and engaging the members for yieldingly holding the same against separation during rolling operation, discharging means connected to the tension holding means, releasable holding means for said discharging means including pivotally connected arms connected at their free ends to the discharging means, and means for releasably holding said arms in substantially parallel overlapping positions.

9. A baling means, a frame, opposed endless members in the frame, means for supporting said members in opposed relation in the frame, operating means engaging each of said members for moving the same with one member opposite the other to form a roll between oppositely disposed movable portions of said members, tension feeding means forwardly of said oppositely disposed portions of the members for initially compressing material passing between said oppositely disposed portions, tension holding means carried by the frame and engaging the members for yieldingly holding the same against separation during rolling operation, discharging means connected to the tension holding means, releasable holding means for said discharging means including pivotally connected arms connected at their free ends to the discharging means, means for releasably holding said arms in substantially parallel overlapping positions, and a tensioning lever mechanism connected to said arms for yieldingly urging the same into their normally held positions but admitting swinging apart of said arms under pressure of the bale being formed.

UMMO F. LUEBBEN.